United States Patent [19]

Utsugi

[11] Patent Number: 4,598,106

[45] Date of Patent: Jul. 1, 1986

[54] PRESSURE-RESISTANT BUOYANCY MATERIAL

[75] Inventor: Katsumi Utsugi, Hidakamachi, Japan

[73] Assignees: Nippon Oils & Fats Co., Ltd., Tokyo; Nichiyu Giken Kogyo Co., Ltd., Kawagoe, both of Japan

[21] Appl. No.: 714,391

[22] Filed: Mar. 21, 1985

[30] Foreign Application Priority Data

Nov. 9, 1984 [JP] Japan .................. 59-235032

[51] Int. Cl.⁴ ............................................. C08J 9/32
[52] U.S. Cl. .................................... 523/218; 521/54; 521/138; 521/178; 521/182; 523/219
[58] Field of Search .................. 523/219, 218; 521/54, 521/138, 178, 182

[56] References Cited

U.S. PATENT DOCUMENTS

| | | | |
|---|---|---|---|
| 3,230,184 | 1/1966 | Alford | 521/54 |
| 3,849,350 | 11/1974 | Matsko | 521/54 |
| 4,107,134 | 8/1978 | Dawans | 521/54 |
| 4,410,639 | 10/1983 | Bouley et al. | 521/54 |
| 4,412,012 | 10/1983 | Bouley et al. | 521/54 |

Primary Examiner—Morton Foelak
Attorney, Agent, or Firm—Oblon, Fisher, Spivak, McClelland & Maier

[57] ABSTRACT

A pressure-resistant buoyancy material, comprising pressure-resistant hollow elements, a syntactic foam, and an empty space intervening between the pressure-resistant hollow elements and the syntactic foam, communicating with the outside of the buoyancy material. The pressure-resistant hollow elements are retained in a freely movable state in the empty space.

5 Claims, 2 Drawing Figures

PRESSURE-RESISTANT BUOYANCY MATERIAL

BACKGROUND OF THE INVENTION

This invention relates to a pressure-resistant buoyancy material to be used mainly under water of great depth (hereinafter referred to as "deep water").

In recent years, efforts are being continued for the development of techniques for lowering various observation instruments to great depths in the sea, operating them under water, and later raising them to the surface. Such techniques are required for deep water surveys conducted by submarines for economic and academic purposes. The use of such instruments in the manner described above necessitates a pressure-resistant buoyancy material of low specific gravity and high enough strength to withstand severe working conditions under deep water.

As pressure-resistant buoyancy materials capable of producing ample buoyancy under deep water, hollow plastic spheres, hollow glass spheres, syntactic foam compositions, etc. have been in use.

Use of hollow spheres made of metallic material is conceivable. These hollow spheres, however, are not suitable as a buoyancy material because they have a large specific gravity and low buoyancy.

Among commercially available hollow plastic sphere buoyancy materials is a product which is effectively usable under water at depths up to 1500 meters (manufactured by Ube Resin Processing Co., Ltd. and marketed under trademark designation of "Cycolac Flote"). This hollow plastic sphere is made of ABS resin (compression strength 480 kg/cm$^2$) which measures 360 mm in diameter, weighs 10 kg, and has a specific gravity of 0.41.

Among commercially available hollow glass sphere buoyancy materials is a product of Benthos Inc. in the United States, which measures 432 mm in diameter, weighs 17.7 kg, and has a specific gravity of 0.42 and a working water depth of 6000 m. The most serious drawback suffered by any hollow glass sphere resides in the fact that it is vulnerable to shocks.

As means of improving hollow glass spheres by eliminating this serious drawback, the inventor has so far developed a pressure-resistant buoyancy material formed of hollow ceramic spheres and a pressure-resistant buoyancy material formed of hollow ceramic spheres and syntactic foam composition (Japanese Patent Application SHO No. 58(1983)-204729).

The hollow ceramic sphere involved in the invention just mentioned is usable effectively as a buoyancy material under water of a greater depth than the conventional hollow plastic sphere and hollow glass sphere.

These hollow spheres, because of their peculiar shape, invariably necessitate special devices for effective attachment to submarines, which have only complicated contours available for contact with the spheres.

As a convenient buoyancy material for a submarine, therefore, a syntactic foam which is formed of hollow glass microspheres and polyester resin or epoxy resin has found acceptance. Methods for the production of such syntactic foam are disclosed in Japanese Patent Disclosure SHO No. 49(1974)-58162, U.S. Pat. No. 3,477,967, and Japanese Patent Disclosure SHO No. 57(1982)-28142, for example.

The syntactic foam is obtained by pouring a raw material, which is a mixture of hollow glass microspheres and thermosetting resin, in a mold and allowing it to set. Thus, the syntactic foam can be obtained in various shapes conforming exactly to the cavity of a given mold. It therefore proves advantageous for use with a submarine which necessitates a buoyancy material of complicated shape as mentioned above.

The properties of the latest syntactic foam published in the research report, JAMSTECTR 12 (1984), of the Ocean Science Technology Center are shown in the following table.

|  | High-strength type | Low-specific gravity type |
| --- | --- | --- |
| Specific gravity | 0.561 | 0.545 |
| Compression strength (kgf/cm$^2$) | 920 | 867 |
| Crushing strength (kgf/cm$^2$) | 1276 | 1238 |

For any syntactic foam to withstand use under deep water of 6000 m, the compressive strength and the crushing strength are required to be about 900 kgf/cm$^2$ and 1240 kgf/cm$^2$ respectively, with the safety factor calculated as 2. The high-strength type shown in the table meets this requirement. The highest specific gravity obtained by the technique of the existing standard is approximately 0.56.

Today ocean surveys are required to be conducted at still greater depths. To meet the requirements, a need is felt for the development of a buoyancy material, specifically a syntactic foam, possessing lower specific gravity and higher strength.

For the purpose, it is considered to be necessary:

(1) to use hollow glass microspheres having lower specific gravity and higher strength, (2) to improve the packing factor (ratio of bulk to true particle density) of the hollow glass microspheres, and (3) to use resin of high strength.

In order to increase the strength of the hollow glass spheres it is necessary to use glass of high rigidity, which is incompatible with the aim of reducing specific gravity. The packing factor of the hollow glass microspheres can be increased by combining spheres of different diameters, but there is a limit to the degree of compactness that can be obtained. When the product of 3M Corp. marketed under the trademark "Glass Bubble F29x" is adopted and 100-micron and 30-micron grades of the product are mixed in a ratio of 60:40 (so that the average specific gravity of the hollow glass microspheres is about 0.28), for example, the packing factor is 73%. When the gaps separating the adjacent hollow microspheres are filled up with resin of a specific gravity of 1.2, then the produced syntactic foam has an overall specific gravity of 0.528. If the specific gravity of this resin is lowered to decrease the overall specific gravity of the syntactic foam, the syntactic foam itself has the strength thereof proportionally lowered. Where the specific gravity of the hollow microspheres and that of the resin used in the syntactic foam are lowered, then the produced syntactic foam has the strength thereof lowered consequently. It is not possible to effect the desired decrease of specific gravity without a sacrifice of the strength of the syntactic foam.

The inventor continued a study with a view to developing a buoyancy material of improved performance and consequently developed the aforementioned novel pressure-resistant buoyancy material formed of hollow ceramic microspheres and a syntactic foam. This buoyancy material has been filed for patent under Japanese Patent Application SHO No. 58(1983)-204729. As compared with the conventional syntactic foam, this buoyancy material permits further reduction of specific gravity and further increase of strength and is suitable for use under deep water. When the hollow ceramic spheres and the syntactic foam are combined in intimate mutual contact, the ratio of volume reduction under application of pressure differs between the two components of the buoyancy material because the ratio of voluminal elasticity is not equal between them. The pressure so applied, therefore, is liable to impair uniform distribution if stress and lower the overall strength of the buoyancy material.

The present invention is characterized by disposing an empty space in the boundary between the syntactic foam and the hollow ceramic spheres thereby eliminating the disadvantage suffered by the conventional buoyancy material formed of such two components.

SUMMARY OF THE INVENTION

The pressure-resistant buoyancy material of the present invention comprises pressure-resistant hollow spheres and syntactic foam, with an externally communicating empty space interposed between the pressure-resistant hollow spheres and the syntactic foam.

In a typical embodiment of the present invention, the syntactic foam contains an empty space communicating with the outside of the foam and serving to hold the pressure-resistant hollow spheres in a freely movable state. Thus, the pressure-resistant hollow spheres enjoy freedom of motion within the empty space.

An object of this invention is to provide a buoyancy material which consists of syntactic foam and pressure-resistant hollow spheres and which exhibits outstanding resistance to pressure while suffering no loss of strength even under deep water.

BRIEF DESCRIPTION OF THE DRAWINGS

Other objects and features of this invention will become apparent to those skilled in the art as the disclosure is made in the following description of a preferred embodiment of the invention, as illustrated in the accompanying drawings, in which.

DESCRIPTION OF THE PREFERRED EMBODIMENTS

Figure 1:
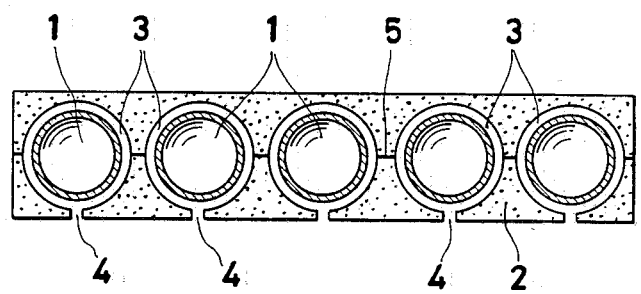
FIG. 1 is a cross-sectional diagram illustrating a buoyancy material of this invention.

Now, the buoyancy material of the present invention will be described below with reference to the accompanying drawings. FIG. 1 represents a typical pressure-resistant buoyancy material of this invention and FIG. 2 a pressure-resistant buoyancy material produced for the purpose of comparison by omitting the provision of an empty space between the syntactic foam and the pressure-resistant hollow spheres. In the drawings, 1 denotes a pressure-resistant hollow sphere, 2 a syntactic foam, 3 an empty space interposed between the syntactic foam 2 and the pressure-resistant hollow sphere 1, 4 a path for communication of the empty space with the outside of the pressure-resistant buoyancy material, 5 a joint between the adjacent syntactic foam pieces, and 6 adhesive agent applied between the pressure-resistant hollow sphere and the syntactic foam.

Figure 2:
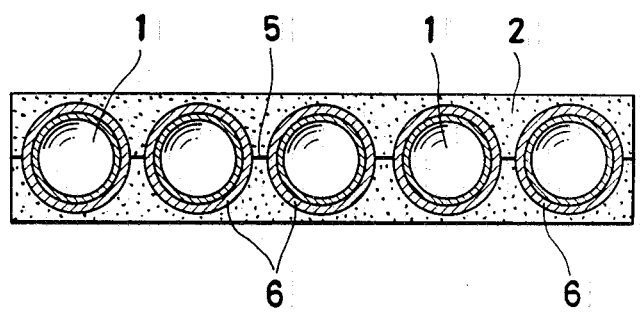
FIG. 2 is a cross-sectional diagram illustrating a buoyancy material described in a Comparative Experiment.

The difference between the buoyancy material of the present invention illustrated in FIG. 1 and the buoyancy material for comparison illustrated in FIG. 2 resides in the fact that the empty space appearing in FIG. 1 is absent in FIG. 2 and the pressure-resistant hollow sphere in FIG. 2 is fastened to the syntactic foam through the medium of the adhesive agent.

Now, a typical method for manufacture of the buoyancy material of the present invention is described below. First, the pressure-resistant hollow spheres are produced. Then, the raw material for the syntactic foam is cast in a molding die having disposed therein a required number of hemispheres of a diameter slightly larger than the outside of the pressure-resistant spheres. Then, the raw material in the molding die is cured by application of heat. After the curing by heating, the molding die is removed to obtain a syntactic foam piece containing hemispherical cavities therein. One more syntactic foam piece of entirely the same shape is produced by repeating the procedure. The two syntactic foam pieces so obtained are joined to each other as illustrated in FIG. 1, with the pressure-resistant hollow spheres placed one each in the cavities. Finally, paths for communication between the empty space and the outside are formed by mechanical working.

In the buoyancy material of the present invention, the syntactic foam and the hollow spheres are not joined to each other but are separated from each other by an intervening empty space and the hollow spheres are retained in a freely movable state and the empty space is allowed to communicate with the outside. When the buoyancy material is placed under water, therefore, the pressure of the surrounding medium, such as sea water, is free to enter the empty space. Thus, the buoyancy material does not suffer any loss of strength even when it is exposed to repeated application of external pressure. The pressure-resistant hollow spheres are desired to be made of ceramic material having a bulk modulus of at least $9 \times 10^3$ kgf/mm. The hollow spheres are desired to have a diameter of not less than 20 mm and specific gravity of 0.2 to 0.5. Optionally, hollow cylinders of substantially the same description can be used instead. The reason for the choice of the specific magnitude of bulk modulus mentioned above is that the decrease of buoyance under pressure is mitigated by lowering the voluminal shrinkage. For the convenience of manufacture, the diameter is desired to be not less than 20 mm and the specific gravity to be not less than 0.2. If the specific gravity is greater than 0.5, the buoyancy is lowered and the object of lowering specific gravity is not fulfilled. As concerns the kind of ceramic material, the ceramic material of alumina type or zirconia type proves advantageous for use in the present invention. The syntactic foam in the buoyancy material of this invention can be obtained by any of the methods known to the art such as, for example, the vacuum mixing method or the vacuum impregnation method which effects combination of hollow glass microspheres and unsaturated polyester resin or epoxy resin.

In the cavity of the syntactic foam, the pressure-resistant hollow sphere is required to occupy 99.7% to 95% of the volume of the cavity.

In other words, the difference between the volume of the cavity in the syntactic foam and that of the pressure-resistant hollow sphere, i.e. 0.3% to 5% of the volume of the cavity, represents the empty space for admitting the external pressure medium. If this empty space is smaller than 0.3%, the pressure applied to the buoyancy material causes the syntactic foam to adhere tightly to the pressure-resistant hollow sphere because the amount of shrinkage of the syntactic foam is greater than that of the pressure-resistant hollow sphere. Moreover, the syntactic foam sustains cracks under increased pressure. If this empty space is larger than 5%, however, there ensues the disadvantage that the buoyancy is not sufficient.

Typical compositions of the syntactic foam usable advantageously for this invention are shown below.

(1)

| | | |
|---|---|---|
| (1) | Hollow glass microspheres (specific gravity of 0.32) (product of 3M Corp., "Glass Bubbles, D 32/4500" in commercial designation) | 32 wt % |
| (2) | Unsaturated polyester resin (product of Nippon Shokubai Kagaku Kogyo Co., Ltd., "Epolac G82" in commercial designation) which comprises styrene and unsaturated polyester composed of phthalic anhydride, maleic anhydride and propylene glycol | 67 wt % |
| (3) | Curing agent (product of Nippon Oils & Fats Co., Ltd., "Permek N" in commercial designation) having the formula | 0.5 wt % |

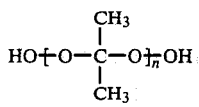

| | |
|---|---|
| wherein n is an integer in the range of from 1 to 6 | |
| (4) Curing promoter (product of Japan Chemical Industry Co., Ltd., "Naphtex Cobalt" (Co 6%) in commercial designation) having the formula | 0.5 wt % |

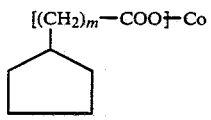

| | | |
|---|---|---|
| | wherein n is an integer of from 1 to 3 | |
| | Specific gravity of cured syntactic foam | 0.62 g/cc |
| | Crushing strength of cured syntactic foam | 1350 kgf/cm$^2$ |
| (2) | | |
| (1) | Hollow glass microspheres (specific gravity 0.28) (product of 3M Corp., "Glass Bubbles, F29x" in commercial designation) | 35 wt % |
| (2) | Unsaturated polyester resin (product of Nippon Shokubai Kagaku Kogyo Co., Ltd., "Epolac RF1001" in commercial designation) which is a vinyl ester resin of styrenes and epoxy ester composed of bisphenol type epoxy resin and methacrylic acid | 53 wt % |
| (3) | Shrinkproofing agent for unsaturated polyester resin (product of Nippon Shokubai Kogyo Co., Ltd., "Epolac AT100" in commercial designation) consisting of styrene monomer solution containing 30% polystyrene | 10.0 wt % |
| (4) | Silane coupling agent (product of Nippon Unicar Co., Ltd., "Silicone A174" in commercial designation) having the formula | 1.0 wt % |

$$CH_2=C-\overset{CH_3}{\underset{\underset{O}{\parallel}}{C}}-OCH_2CH_2CH_2Si(OCH_3)_3$$

| | | |
|---|---|---|
| (5) | Curing agent (product of Nippon Oils & Fats Co., Ltd., "Permek N" in commercial designation) | 0.4 wt % |
| (6) | Curing promoter (product of Japan Chemical Industry Co., Ltd., "Naphtex Cobalt" (Co 6%) in commercial designation) composed of 55% methyl ethyl ketone peroxide and 45% dimethyl phthalate | 0.6 wt % |
| | Specific gravity of cured syntactic foam | 0.54 g/cc |
| | Crushing strength of cured syntactic foam | 1260 kgf/cm$^2$ |

The material for the hollow spheres is not limited to ceramics. It has been confirmed that even when the hollow spheres are made of glass possessing sufficient resistance to pressure, otherwise inevitable degradation of strength due to the difference of ratio of voluminal elasticity between the spheres and the syntactic foam can be precluded by interposing the empty space along the boundary of the two components.

Now, the invention will be described more specifically below with reference to a working example and a comparative experiment.

EXAMPLE

Pressure-resistant hollow spheres having an outside diameter of 96 mm, weight of 171 g, and specific gravity of 0.37 were made of alumina ceramic having an aluminum content of 84%. (The physical properties of the alumina ceramic, as determined of test pieces, were compression strength of 210 kgf/mm$^2$, bulk modulus of $2.2 \times 10^4$ kgf/mm, Poisson ratio of 0.19, and true specific gravity of 3.22). Each of the spheres was produced by forming two hemispheres by the conventional lathing method, sintering the formed hemispheres, allowing the sintered hemispheres to cool down, abrading the edges of the hemispheres, and joining the hemispheres.

A syntactic foam was obtained by vacuum mixing (1) 32% by weight of hollow glass microspheres having specific gravity of 0.32 (product of 3M Corp., "Glass Bubbles, grade D32/4500" in commercial designation), (2) 67% by weight of unsaturated polyester resin (product of Nippon Shokubai Kagaku Kogyo Co., Ltd., "Epolac G-82" in commercial designation), (3) 0.5% by weight of curing agent (product of Nippon Oils & Fats Co., Ltd., "Permec N" in commercial designation), and (4) 0.5% by weight of curing promoter (product of Japan Chemical Industry Co., Ltd., "Naphtex Cobalt" (Co 6%) in commercial designation).

The molding die for the syntactic foam was a block, 110 mm × 60 mm × 505 mm in dimension, formed with five regularly spaced 97 mm hemispheres. The aforementioned raw material for syntactic foam melted by heat was cast in this molding die and then cured. Consequently, a syntactic foam incorporating semispherical cavities for admitting hollow spheres was obtained. This syntactic foam was finished in visible dimensions of 100 mm × 50 mm × 500 mm by cutting the rough edges. Another syntactic foam of entirely the same shape was produced by repeating the procedure described above. The two syntactic foam pieces were joined at the portions indicated by 5 in the drawing, with the aforementioned pressure-resistant hollow spheres of alumina ceramic placed one each in the spherical cavities. The spheres were formed by semispheres as illustrated in FIG. 1. Consequently, an empty space 3 occurred between the pressure-resistant hollow spheres and the syntactic foam. A buoyancy material according to this invention was obtained by forming paths for communication between the empty space and the outside. The overall specific gravity of this buoyancy material was 0.500 and the apparent gravity including the empty space of this buoyancy material was 0.493.

This buoyancy material was placed in a high-pressure water tank and the water pressure applied on the buoyancy material was gradually increased to test for crushing strength. The syntactic foam in the material was crushed when the water pressure rose to 1350 kgf/cm$^2$. Under this pressure, however, the pressure-resistant hollow spheres of alumina ceramic remained intact. When another buoyancy material produced by the same procedure was subjected to a pressure cycle test alternately exposing the material to the pressure up to 600 kgf/cm$^2$ and completely relieving the material of pressure, no abnormal phenomenon developed in the material until after 2500 cycles.

COMPARATIVE EXPERIMENT

Pressure-resistant hollow spheres of alumina ceramic and a syntactic foam were produced by faithfully repeating the procedure of Example. Three buoyancy materials were produced by using the hollow spheres and the syntactic foam pieces, with adhesive agent filling the gaps between the pressure-resistant hollow spheres and syntactic foam as illustrated in FIG. 2.

In the same manner as in Example, the three buoyancy materials were tested for crushing strength. In all the buoyancy materials, the hollow spheres of alumina ceramic were crushed under pressure of 200 kgf/cm$^2$.

All the pressure-resistant hollow spheres of alumina ceramic, before incorporation in the buoyancy materials, were subjected to a test of five successive applications of pressure of 800 kgf/cm$^2$. None of them was crushed. Thus, the difference between Example and Comparative Experiment was quite distinct.

Since the buoyancy material according to the present invention was incorporated with paths for enabling the gaps separating the pressure-resistant hollow spheres of alumina ceramic and the syntactic foam to communicate with the outside of the material, it enjoys a notable improvement of crushing strength in spite of a heavy decline of specific gravity of the syntactic foam to 0.50, a value even below the lower limit of 0.54 imposed on the conventional syntactic foam.

Thus, the present invention has realized production of a buoyancy material having lower specific gravity and higher strength than the conventional buoyancy material. Thus, it promises to make feasible the construction of an underwater vehicle for descending to greater depths.

Although the pressure-resistant hollow spheres used in the working example and the comparative experiment cited above were made of alumina ceramic, this invention is applicable to pressure-resistant hollow spheres made of other material.

What is claim is:

1. A pressure-resistant buoyancy material, which comprises two identical molded pieces of unsaturated polyester resin or epoxy resin syntactic foam containing uniform hemispheric depressions, said pieces having been joined to each other so that each hemisphere forms a spherically shaped cavity therein, where each cavity contains therein a hollow pressure-resistant sphere which is smaller in diameter than said cavity so that said sphere is freely movable in said cavity, and further wherein each cavity communicates with the outside of said molded pieces by way of an empty path through said syntactic foam.

2. A buoyancy material according to claim 1, wherein each of said hollow pressure-resistance spheres is made of ceramic material and possesses a bulk modulus of at least $9 \times 10^3$ kgf/mm.

3. A buoyancy material according to claim 1, wherein each of said hollow pressure-resistance spheres has a volume which is 95% to 99.7% of the volume of each of said cavities.

4. A buoyancy material according to claim 1, wherein each of said hollow pressure-resistant spheres has a diameter of at least 20 mm and a specific gravity in the range of 0.2 to 0.5.

5. A buoyancy material according to claim 2, wherein said ceramic material is selected from the group consisting of alumina ceramic and zirconia ceramic.

* * * * *